Aug. 8, 1939.　　　　C. R. KLEIN　　　　2,168,938
FISHING REEL
Filed May 13, 1935　　　　2 Sheets-Sheet 1

INVENTOR
Carl R. Klein
BY James M. Abbett
ATTORNEY

Aug. 8, 1939. C. R. KLEIN 2,168,938
FISHING REEL
Filed May 13, 1935 2 Sheets-Sheet 2
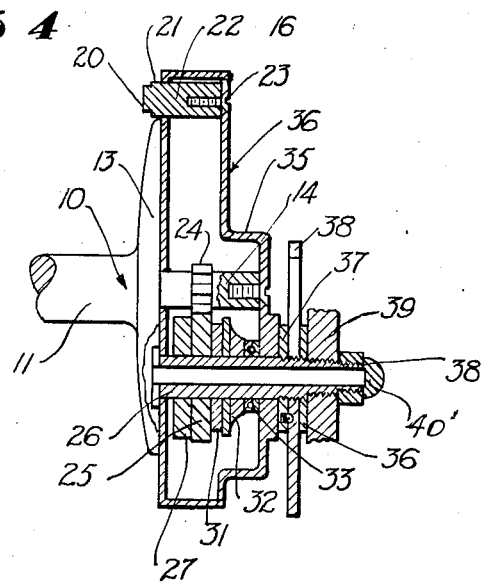
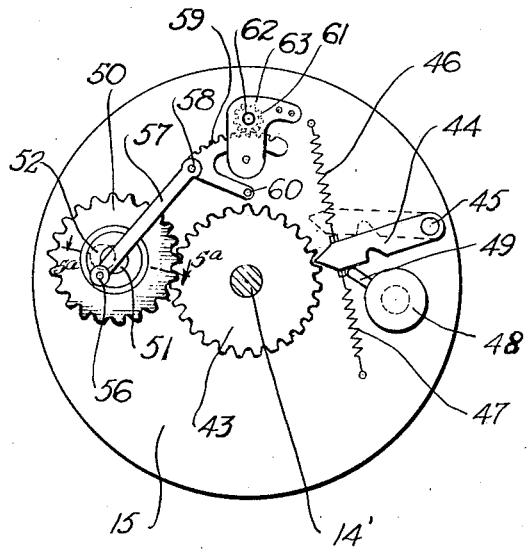
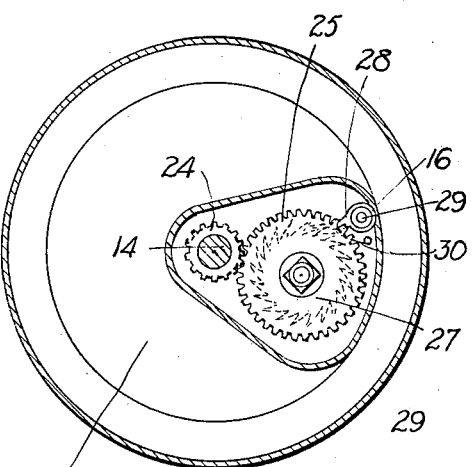
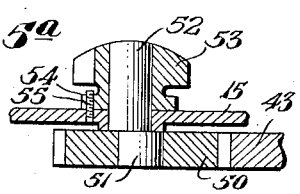
INVENTOR
Carl R. Klein
BY James M. Abbett
ATTORNEY Patented Aug. 8, 1939

2,168,938

UNITED STATES PATENT OFFICE 2,168,938

FISHING REEL

Carl R. Klein, Santa Monica, Calif.

Application May 13, 1935, Serial No. 21,210

2 Claims. (Cl. 242—84.5)

This invention relates to fishing tackle and particularly pertains to a fishing reel.

In deep sea fishing it is desirable to provide a reel for the fishing line which embodies means whereby the line may be readily wound onto the reel when desired, and from which reel the line can be easily paid out or yieldably held so that a variable degree of resistance may be offered to the unwinding operation. It is the principal object of the present invention therefore to provide a reel especially adapted for use in fishing, the spool of which may be optionally driven by mechanical means, may be positively locked against rotation, and by a simple operation may be adjusted so that resistance to unwinding may be at any desired degree from positive locking to free rotation of the spool, the structure being further provided with means for sounding an initial alarm when the line is being withdrawn from the reel for automatically interrupting the alarm, and other means for creating a desired drag upon the reel.

The present invention contemplates the provision of a fishing reel having a frame work adapted to be easily mounted upon a fishing pole and within which frame work a spool is rotatably supported, said spool being provided with a winding crank, clutch means for rendering the winding crank effective, or non-effective, a drag mechanism for optionally controlling the resistance to rotation of the spool in either direction, and an alarm device which may be set to sound an alarm when the spool is being wound by tension on the line.

The invention is illustrated by way of example in the accompanying drawings in which:

Fig. 4 is a view in transverse section and elevation showing a fragmentary portion of the winding structure as seen on the line 4—4 of Fig. 2.

Fig. 5 is a view in end elevation showing the signal and drag mechanism as seen on the line 5—5 of Fig. 1. Fig. 5a is an enlarged view in section taken on the line 5a—5a of Figure 5 showing the mounting of the movable gear.

Fig. 6 is a view in end elevation showing the drive mechanism with the outer cover removed as viewed in the general direction of the arrows 2—2 in Fig. 1.

Figure 1:
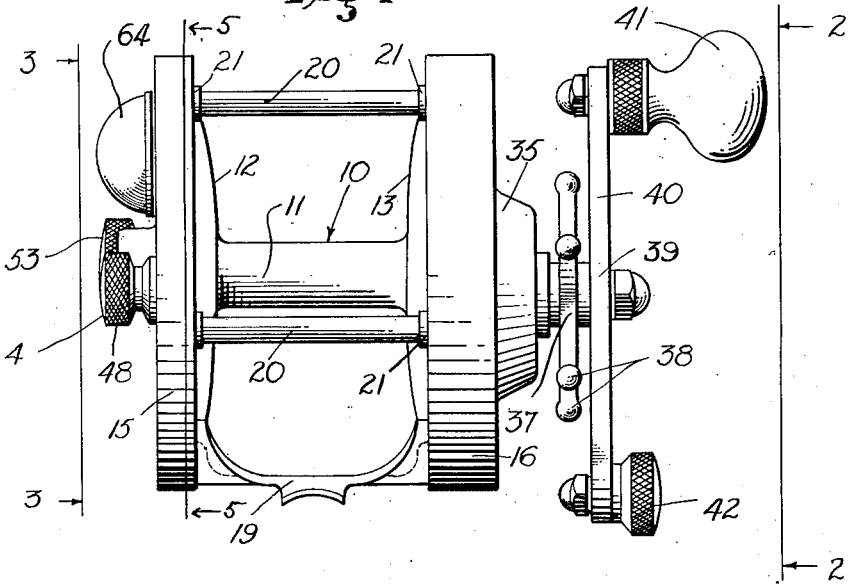
Figure 1 is a view in side elevation showing the completely assembled structure.
Figure 2:
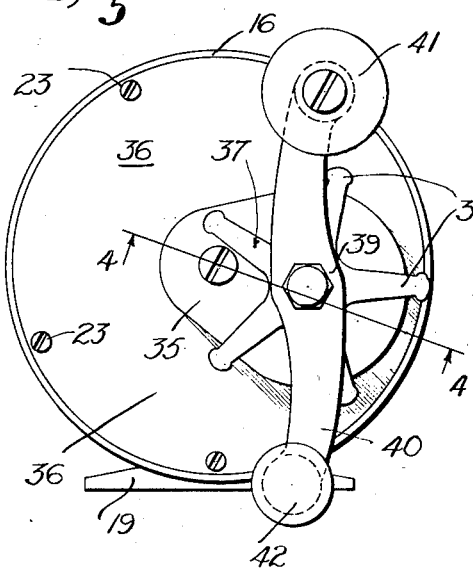
Fig. 2 is a view in end elevation showing the structure as viewed in the direction of the arrows 2—2 of Fig. 1.
Figure 3:
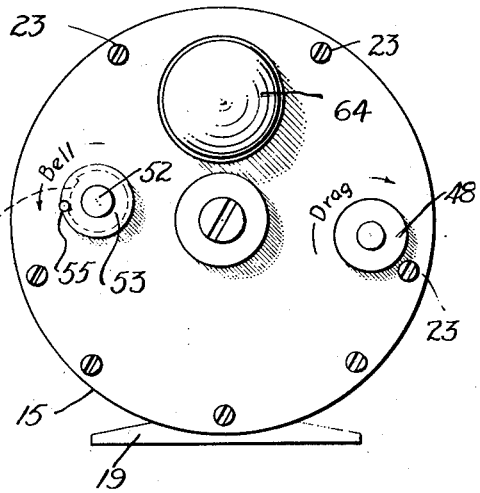
Fig. 3 is a view in end elevation showing the structure as viewed in the direction of the arrows 3—3 of Fig. 1.

Referring more particularly to the drawings, 10 indicates a fishing line spool. This spool has a central cylindrical spindle 11 and opposite end flanges 12 and 13. The spool, as well as all of the other exposed parts of the structure to be presently described, are made of metal, preferably an alloy which has the properties of resisting the corrosive action of salt water and other minerals which might be present in the water. The spindle 11 has extensions 14 at its opposite ends which are rotatably supported in bearing openings of the housing members 15 and 16 which form a part of the frame for the reel. These openings are closed at their outer ends by screws 14'. These housing members each have a cylindrical marginal flange into which the flanges 12 and 13 of the spool 10 project, thus making it impossible for the line which might be wound upon the reel to ride over the ends of the spool and become entangled in the winding mechanism. A saddle plate 19 is secured to the inner faces of the housing members 15 and 16 and holds them in rigid spaced relation to each other. Spacing members 20 are also provided and are disposed between the housing members 15 and 16 at intervals along their circumference to act in conjunction with the saddle member 19 in holding the housing sections 15 and 16 rigidly with relation to each other and in assembled relation to the spool. The spacing members 20 are formed with shoulders 21 and have outer portions or extensions 22 projecting through openings in the housing members 15 and 16 and receiving fastening screws 23. It is often desirable to change the size and capacity of a reel being used, and due to the fact that the operating units associated with the housing members 15 and 16 would remain the same size, it is possible to interchange saddle members 19 and spacing members 20 so that they will be of shorter or longer length and will hold the structure in assembled position when spools of shorter or longer length are used. This makes it unnecessary to have several reels for different purposes and different weights of lines, since the operating mechanism of the present invention would serve its intended purposes under these varying conditions, while merely requiring saddles 19 and spacers 20 of different lengths to agree with the lengths of the spools used. The extension 14 of the spool 10 which projects into the housing 16 is provided with a primary gear 24. This primary gear is keyed to the extension 14 and is in constant mesh with a secondary gear of relatively larger diameter indicated at 25. The secondary gear 25 is carried upon a tubular shaft 26 upon which it may freely rotate under normal conditions. At the end of the shaft 26 there is disposed a ratchet wheel 27 which is fastened to the tubular shaft 26 and is engaged by a ratchet pawl 28 carried by the housing 16. This pawl is mounted upon a pivot 29 and is yieldably held against the circumferential face of the ratchet wheel by a spring 30. The inclination of the ratchet wheel teeth is such as to insure that reverse rotation of the ratchet wheel and its shaft cannot be accomplished at any time.

Disposed on the opposite side of the gear 25 from the ratchet wheel 27 is a friction washer 31. Disposed against the friction washer and splined to the shaft 26 is a pressure collar 32 against which an anti-friction thrust bearing 33 is disposed. The outer end of the shaft 26 projects through a portion 35 of a cover plate 36 which is carried as a part of the housing 16. The extending portion of the shaft 26 is threaded to receive a nut 37 which is provided with a plurality of radially disposed operating arms 38 by which it may be tightened or released. Mounted beyond the end of the nut 37 upon a reduced portion 38 of the shaft 26 is the hub 39 of an operating lever 40 which is secured in position by a nut 40'. This lever extends in opposite directions from the axis of the shaft 26 and in a plane at right angles thereto. At one end of the lever 40 the main knob 41 is fastened and upon the opposite end a relatively small balance knob 42 is secured. Due to this construction it is possible to obtain considerable purchase upon the shaft when the shaft is rotated by the operating levers or crank. At the opposite end of the line spool spindle 11 the extension 14 carries a drag gear 43 which is secured thereto. The gear thus rotates in unison with the spool. This operates in conjunction with a drag by which friction is imposed upon the spool against rotation in either of its directions. A drag pawl 44 is provided to move into mesh with the teeth of the gear 43 and to stand in a position of radial alignment therewith as supported by a pivot pin 45. Springs 46 and 47 are secured at opposite sides of the pawl so that it may yield in either direction from its drag position, and will be restored to that position when moving over a tooth of the drag gear 43 and into the gullet between that tooth and the next succeeding tooth. The drag pawl 44 may be thrown out of engagement with the drag gear 43. This is accomplished by an operating knob 48 which may be rotated to swing a pin 49 against the pawl and to move it to a locked position where it will hold the pawl out of engagement with the circumference of the drag gear 43. On the same end of the spool as the drag and within the housing section 15 there is also carried a shiftable gear 50. This gear is rotatably mounted upon a trunnion 51 which in turn is carried upon a shaft 52. The shaft 52 formed integral with the trunnion 51 and with its axis eccentric thereto extends through the end wall of the housing section 15 where it is rotatably supported and provided with an operating knob 53 so that as the shaft 52 is rotated the trunnion may be moved eccentrically to bring the gear 50 into mesh and driving engagement with the gear 43 after which the gear 50 will rotate upon the trunnion 51 if driven. This knob has a supporting flange formed with an arcuate notch in its edge of a desired length as indicated at 54 to receive a pin 55 by which the degree of rotation of the knob 53 is determined and limited. Rotation of shaft 52 within its fixed bearing will move the gear 50 toward and away from a meshing position with relation to the drag gear 43 as the trunnion 51 moves around the axis of shaft 52 for a degree of movement limited by the stop pin 55 in the notch 54 of the knob 53 and when the gear 50 is in mesh with the gear 43 it will be driven thereby. A pivot screw 56 is carried upon the gear 50 and is disposed eccentrically of its rotating axis. This screw is connected to a pitman rod 57 which in turn is pivoted at 58 to a gear segment 59. The gear segment 59 is mounted upon a pivot 60 so that as the pitman rod moves throughout the cycle of its travel the gear segment 59 will be moved back and forth. The teeth on the gear segment are in constant mesh with the teeth on the gear pinion 61. The pinion is carried upon a pivot pin 62 supported by a bearing bracket 63. This pinion extends through the end plate of the housing 15 and operates a suitable ringing mechanism of a bell 64. It will thus be seen that due to this arrangement the bell will ring when the spool is rotated as occasioned by a paying out of the line as it is drawn. Attention, however, is directed to the fact that the eccentric relationship between the members 51 and 52 is such as to insure that when the operator begins to wind upon the reel the force will tend to move the gear 50 away from the drag gear 43 as the shaft 52 is rotated, and will after a short number of rotations of the spool throw these gears out of mesh and automatically render the signal inoperative.

In operation of the present invention the device is assembled as shown in the drawings. A fishing line is attached to the spool 10 and may be wound thereon. In the winding operation the nut 37 is tightened so that the pressure collar 32 will frictionally engage the friction washer 31 and will clamp the secondary gear 25 so that it will move in unison with the ratchet 27 and the shaft 26. As this takes place the pawl 29 will rotate over the teeth of the ratchet 27 and while permitting winding of the line on to the spool 10 will prevent a reverse rotation of the spool 10. When the line is in proper position on the spool or is being cast the member 38 may be turned to release the secondary gear 25 from its clamped position. This will insure that the secondary gear may rotate freely on the shaft 26 in the event that the spool 10 turns. When the reel is in its proper position the bell knob 53 may be rotated and will move the eccentric trunnion 51 to shift the gear 50 into mesh with the drag gear 43. This will insure that when a fish is on the line the drag gear 43 will drive the gear 50 and set the bell operating mechanism in motion to ring the bell. At any time desired the knob 48 may be moved to place the drag pawl 44 into engagement with the drag gear 43. Thus the drag will operate on either a winding rotation of the spool or an unwinding rotation. After the signal has been made by the bell the operator may rotate the member 38 to set the secondary gear 25 so that rotation of the operating lever 40 will rotate the spindle 11 and will wind the line on the spool 10. As this is done the drag gear 43 will act automatically to rotate and in its movement will force the gear 50 outwardly to a position where it will not mesh with a drag gear 43. When this takes place the bell or other signal will be silent.

It will thus be seen that the structure here disclosed comprises a sturdy and compact reel which may turn free, or be easily set to unwind under a controlled amount of resistance, may be mechanically wound, and which when desired will operate a signal and automatically discontinue the operation thereof.

While I have shown the preferred form of my invention, as now known to me, it will be understood that various changes might be made in the combination, construction, and arrangement of parts by those skilled in the art without departing from the spirit of the invention as claimed.

Having thus described my invention, what I claim and desire to secure by Letters Patent is:

1. A fishing reel comprising a frame, a spool rotatably supported thereby, means for rotating the spool including a gear operatively connected with the spool and rotatable with the same, signal means, means for actuating the signaling means, a gear, a crank element associated with said gear and having an eccentrically mounted axis and being movable into and out of mesh with the said spool gear to be driven thereby, and a pitman connecting said crank element with said signal means, the axis of the eccentric mounted driven gear being disposed with relation to that of the spool gear so as to cause the spool gear to move the driven gear out of mesh therewith and to interrupt the signaling operation.

2. A fishing reel comprising a housing structure, a spool having spindle extensions forming trunnions rotatably mounted on said housing structure, one of said trunnions forming a primary shaft mounted on said housing structure, a gear on said primary shaft, a secondary shaft, a gear freely mounted on said secondary shaft and being constantly in mesh with said gear on said primary shaft, clutch means adapted for optional operation to connect between said secondary shaft and its gear, a drag gear on one of said trunnions, a click element having engagement with said drag gear for resisting rotation of said gear in both directions, a signal, means for moving said click element into and out of engagement with said gear, a trunnion on said housing, a gear on said trunnion movable toward and away from engagement with said drag gear, and means operable by said movable gear for actuating said signal.

CARL R. KLEIN.